(12) United States Patent
Horita

(10) Patent No.: US 8,531,667 B2
(45) Date of Patent: Sep. 10, 2013

(54) PRINT COLOR PREDICTING METHOD, PRINT COLOR PREDICTING APPARATUS, COMPUTER-READABLE RECORDING MEDIUM WITH PRINT COLOR PREDICTING PROGRAM RECORDED THEREIN, AND PROFILE GENERATING METHOD

(75) Inventor: Shuhei Horita, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 351 days.

(21) Appl. No.: 12/892,508

(22) Filed: Sep. 28, 2010

(65) Prior Publication Data

US 2011/0077921 A1 Mar. 31, 2011

(30) Foreign Application Priority Data

Sep. 29, 2009 (JP) .................. 2009-224442

(51) Int. Cl.
*G01J 3/46* (2006.01)

(52) U.S. Cl.
USPC .......................................... 356/402

(58) Field of Classification Search
USPC .......................................... 358/1.9; 356/402
See application file for complete search history.

(56) References Cited

U.S. PATENT DOCUMENTS

| | | | |
|---|---|---|---|
| 2002/0180996 A1* | 12/2002 | Allen et al. ................... | 358/1.9 |
| 2003/0072043 A1 | 4/2003 | Hagai et al. | |
| 2007/0058186 A1 | 3/2007 | Tanaka | |
| 2009/0195845 A1 | 8/2009 | Hoshii et al. | |
| 2009/0219554 A1* | 9/2009 | Freyer et al. ................... | 358/1.9 |
| 2011/0032546 A1* | 2/2011 | Dalal et al. ................... | 358/1.9 |
| 2011/0063618 A1* | 3/2011 | Horita ........................... | 356/402 |
| 2012/0105882 A1* | 5/2012 | Horita ........................... | 358/1.9 |

FOREIGN PATENT DOCUMENTS

| | | |
|---|---|---|
| EP | 1 267 217 A2 | 12/2002 |
| EP | 2 284 511 A1 | 2/2011 |
| JP | 06-246881 A | 9/1994 |
| JP | 2000346706 A | 12/2000 |
| JP | 2007-081586 A | 3/2007 |
| WO | 2008024295 A2 | 2/2008 |

OTHER PUBLICATIONS

"Paper Properties and their Evaluation Method with Latest Relevant Testing Standards", Imaging Today: "What is Paper", Journal of the Imaging Society of Japan, 2004, 150 English Abstract.

Communication pursuant to Article 94(3) EPC, dated Aug. 28, 2012, issued in corresponding EP Application No. 10 178 596.2, 5 pages.

Communication, dated Feb. 13, 2012, issued in corresponding EP Application No. 10178596.2, 11 pages.

Hébert et al, "Compositional reflectance and transmittance model for multilayer specimens," Journal of the Optical Society of America, vol. 24, No. 9, Sep. 1, 2007, pp. 2628-2644.

(Continued)

*Primary Examiner* — Kara E Geisel

(74) *Attorney, Agent, or Firm* — Sughrue Mion, PLLC

(57) ABSTRACT

First spectral data (spectral reflectance) of a printed object is obtained, and second spectral data (optical material characteristic value) of a laminating film is estimated. Then, using the first spectral data and the second spectral data, fourth spectral data (spectral reflectance) is predicted.

11 Claims, 12 Drawing Sheets

(56) References Cited

OTHER PUBLICATIONS

Faul et al, "Psychophysical model of chromatic perceptual transparency based on substractive color mixture," Journal of the Optical Society of America, vol. 19, No. 6, Jun. 1, 2002, p. 1084-1095.

D'Zmura et al, "The colors seen behind transparent filters," Perception, vol. 29, No. 8, Aug. 1, 2000, pp. 911-926.

Rejection of the Application, dated Jul. 2, 2013, issued in corresponding JP 2009-224442, 8 pages in English and Japanese.

* cited by examiner

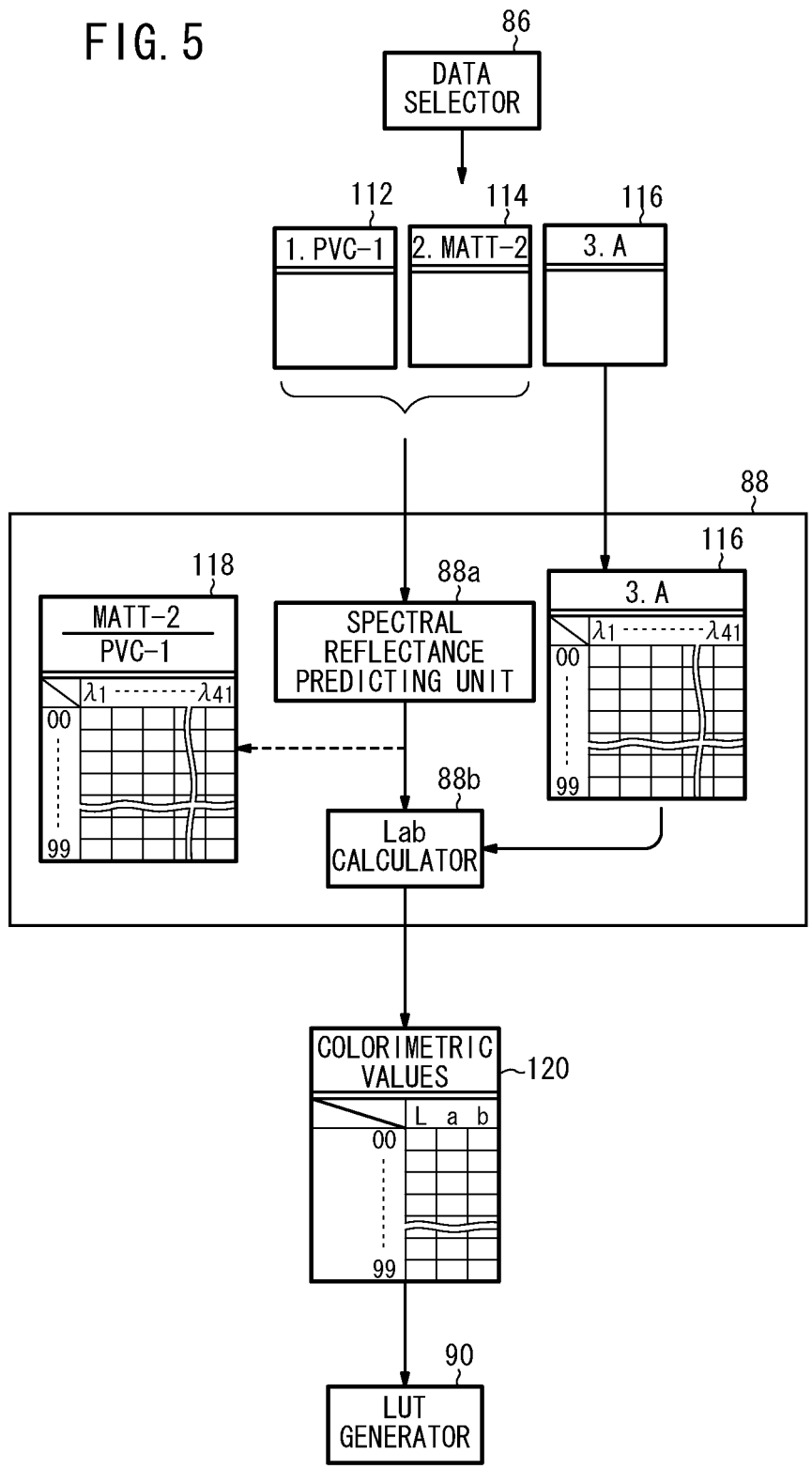

FIG. 6A

SETTING OF PROFILE GENERATING CONDITIONS

| PRINT MEDIUM | PVC(A) ▷ | 132 |
| LAMINATING FILM | MATT B ▷ | 134 |
| LIGHT SOURCE | A ▷ | 136 |
| PROFILE NAME | | 138 |

GENERATE 140   CANCEL 142

FIG. 6B

SETTING OF PROFILE GENERATING CONDITIONS

| PRINT MEDIUM | PVC(A) ▷ | 132 |
| LAMINATING FILM | PVC(A) / PVC(C) / TARPAULIN A / TARPAULIN B ◁ | 146, 144 |
| LIGHT SOURCE | | |
| PROFILE NAME | | 138 |

GENERATE 140   CANCEL 142

FIG. 6C

SETTING OF PROFILE GENERATING CONDITIONS

| PRINT MEDIUM | PVC(A) ▷ | 132 |
| LAMINATING FILM | MATT B ▷ | 134 |
| LIGHT SOURCE | MATT B / SEMI MATT A / SEMI MATT B / GLOSS A ◁ | 150, 148 |
| PROFILE NAME | ▷ | |

GENERATE 140   CANCEL 142

FIG. 6D

SETTING OF PROFILE GENERATING CONDITIONS

| PRINT MEDIUM | PVC(A) ▷ | 132 |
| LAMINATING FILM | MATT B ▷ | 134 |
| LIGHT SOURCE | A ▷ | 136 |
| PROFILE NAME | D50 / D65 / A / F8 ◁ | 154, 152 |

GENERATE   CANCEL 142

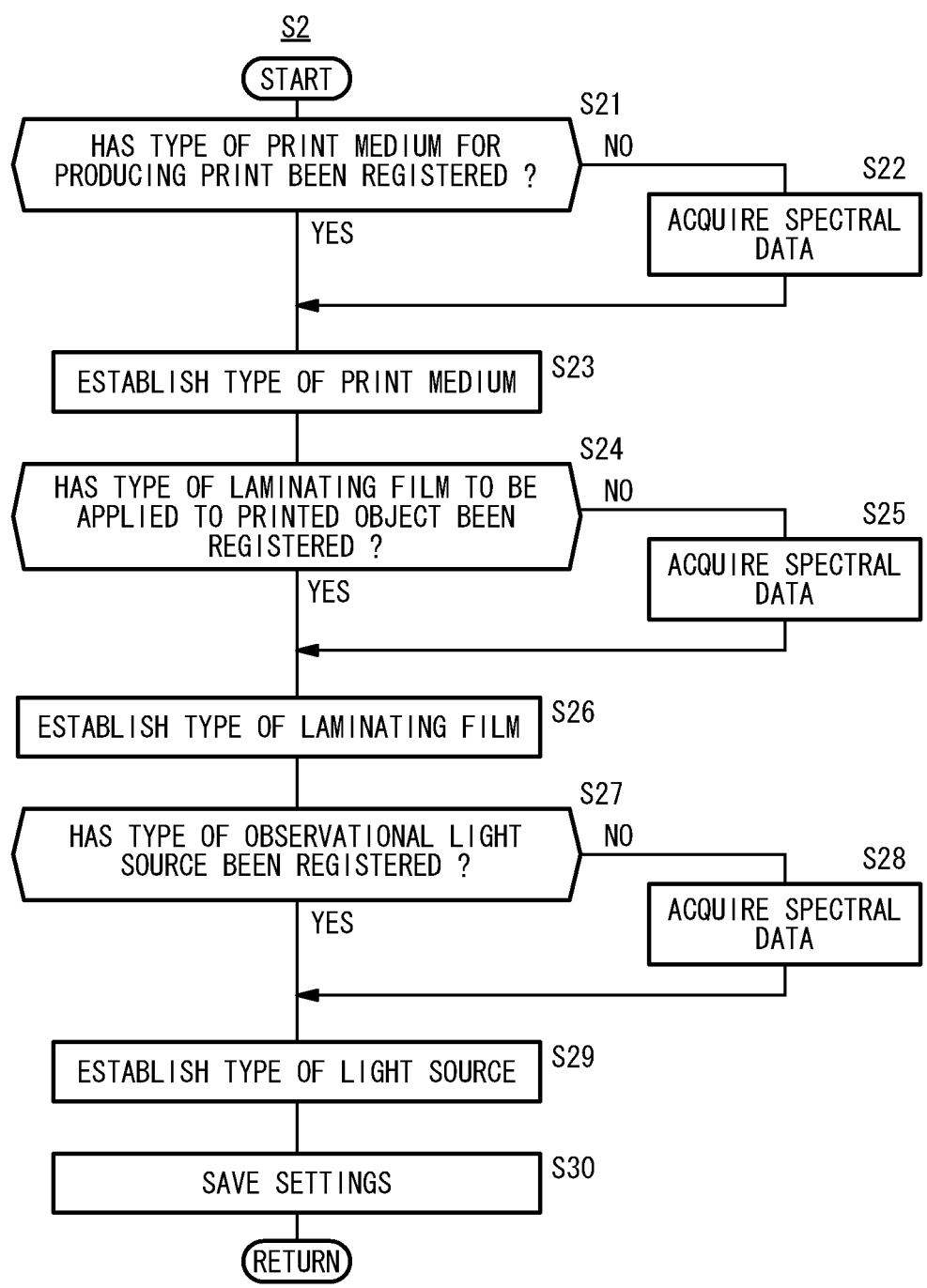

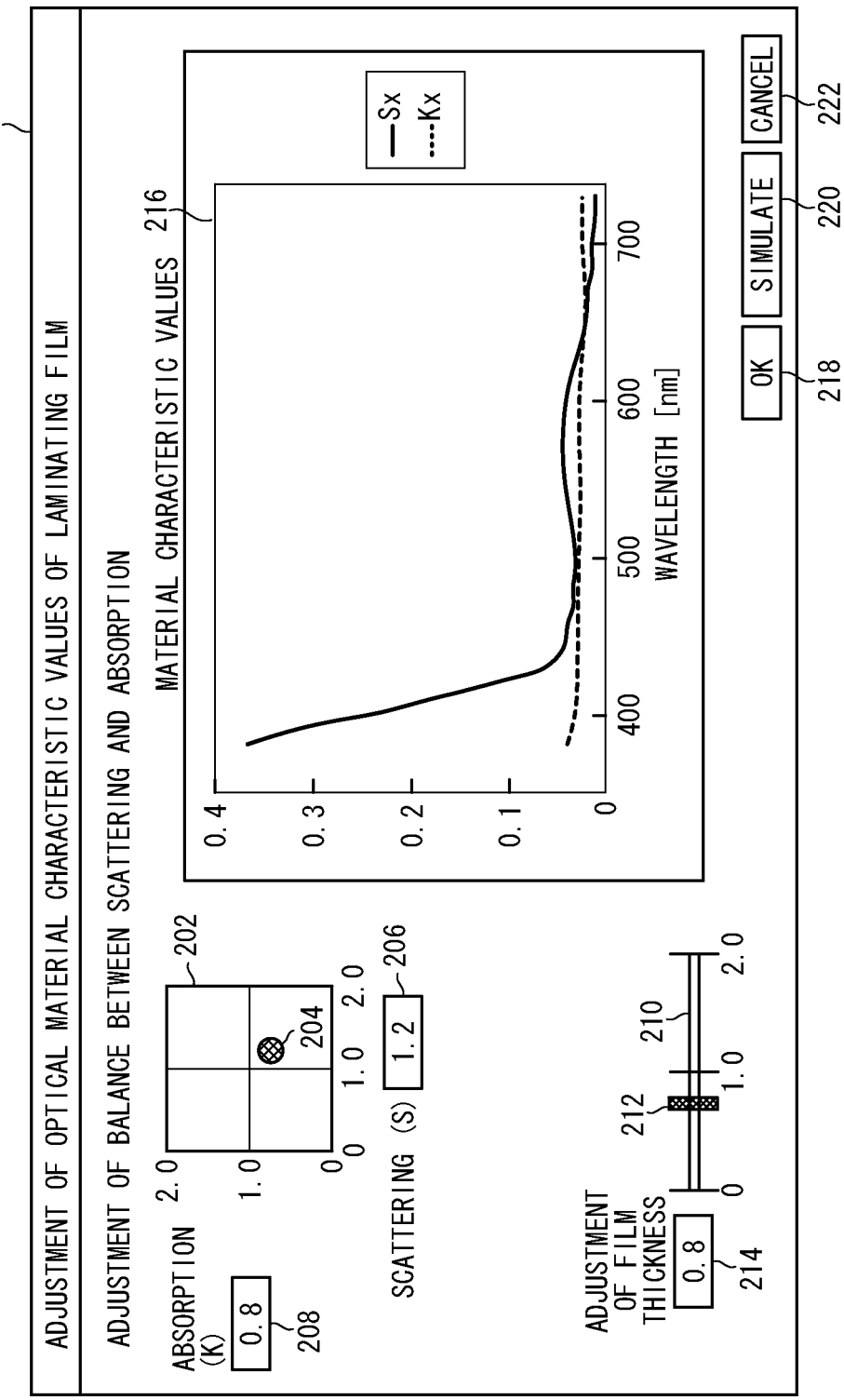

PRINT COLOR PREDICTING METHOD, PRINT COLOR PREDICTING APPARATUS, COMPUTER-READABLE RECORDING MEDIUM WITH PRINT COLOR PREDICTING PROGRAM RECORDED THEREIN, AND PROFILE GENERATING METHOD

CROSS-REFERENCE TO RELATED APPLICATION

This application is based upon and claims the benefit of priority from Japanese Patent Application No. 2009-224442 filed on Sep. 29, 2009, of which the contents are incorporated herein by reference.

BACKGROUND OF THE INVENTION

1. Field of the Invention

The present invention relates to a print color predicting method, a print color predicting apparatus, a computer-readable recording medium with a print color predicting program recorded therein, and a profile generating method, which are capable of predicting color reproduction of a protective-film-covered print, in which a printed object is covered by a protective film.

2. Description of the Related Art

With significant advances in inkjet technology in recent years, it has been become possible for inkjet printers to produce large color prints of high quality at high speeds. Inkjet printers are not only popular for private or home use, but also are widely used in commercial applications nowadays. Inkjet printers enable prints to be made on POP (Point Of Purchase) posters, wall posters, large-size mediums such as outdoor advertisements and billboards, roll mediums, and thick hard mediums.

There are a wide variety of print mediums (hereinafter also referred to as "mediums") available for use in prints in order to meet various commercial demands. For example, such print mediums include paper mediums including synthetic paper, thick paper, aluminum-evaporated paper, etc., resin mediums made of vinyl chloride, PET, etc., and tarpaulin paper made of a woven fiber cloth with synthetic resin films applied to both surfaces thereof.

Since advertisement prints are expected to be effective in arousing consumers' motivation to buy advertised products through visual sensation, the finish of colors of the prints (printed mediums) is of particular importance. Heretofore, there have been disclosed various color matching technologies, such as a method of generating an ICC (International Color Consortium) profile, a method of adjusting a designated color, etc., as print color managing process.

Advertisement prints are displayed in a variety of places including outdoor areas, indoor areas, and spotlighted exhibition sites. Generally, the spectral characteristics (spectral energy distribution) of environmental light as an observational light source for prints vary depending on different places where the prints are displayed. As a result, in cases where the observational light sources differ, even though the same print is viewed, the spectral characteristics of light that ultimately reaches the retinal wall of eyes of the observer are different, and therefore, the appearance of the print (impression of colors) to the observer is subject to variation, although the tendency may differ from observer to observer. As a consequence, if the observational environment in which a print is produced (i.e., the location where the printer is installed) and the observational environment in which the print is displayed differ greatly from each other, then the print may possibly fail to exhibit desired colors.

As one method for solving such problems, Japanese Laid-Open Patent Publication No. 2007-081586 discloses a method and apparatus for storing independently spectral data of a print, and a plurality of light source spectral data. A profile appropriate for an observational light source is generated each time that the observational light source is set up. This publication states that the method and apparatus can generate profiles corresponding to respective different observational light sources for colorimetric measurement in a reduced number of man-hours, and can perform appropriate color management for prints depending on such observational light sources.

Prints produced by inkjet printers may not endure in severe environments because the images thereof are not highly durable, particularly in terms of abrasion resistance and toughness.

For example, in exhibition sites that are exposed to high intensity radiant light at all times, color images of displayed prints tend to become gradually discolored because the dyes included in the inks are gradually decomposed by chemical reactions. Also, in display modes where prints are applied to indoor floors, color images of the prints are likely to become damaged because the print surfaces become abraded by people walking on the floors.

Attempts have been made to increase the durability of print images in such applications by covering the image-formed surfaces of prints with protective films such as laminating films, which are functionally treated by the addition of an ultraviolet absorbent, or through an embossing process.

For example, Japanese Laid-Open Patent Publication No. 06-246881 discloses a protective-film-covered print in which an image-formed surface of print is covered with a protective film. With this feature, the publication states that the quality of a printed surface can be improved in terms of anti-scratch performance and alcohol resistance, as well as anti-permeability.

However, the results of investigation and research conducted by the inventor of the present invention have indicated that, although the laminating film has high transmittance, the spectral transmittance thereof is not necessarily flat within a visible wavelength range, and hence the appearance of printed color images that are covered with the laminating film tends to vary to a non-negligible extent, depending on whether the print is covered with a laminating film or not It also has been discovered that there are many types of commercially available laminating films, which exhibit different spectral transmittances.

Even if the method and the apparatus disclosed in Japanese Laid-Open Patent Publication No. 2007-081586 are applied to the protective-film-covered print disclosed in Japanese Laid-Open Patent Publication No. 06-246881, various prints having various laminating films covering image-formed surfaces thereof (i.e., various protective-film-covered prints) have to be measured colorimetrically, in order to obtain a profile of a protective-film-covered print. However, if colors are to be strictly reproduced with respect to all combinations of laminating films and prints, then it becomes highly tedious and time-consuming to prepare such samples and to colorimetrically measure them. Further, if characteristics of the laminating films are ignored, then the appearance of printed color images through the laminating films varies, depending on the type of laminating film that is used.

SUMMARY OF THE INVENTION

An object of the present invention is to provide a print color predicting method, a print color predicting apparatus, a computer-readable recording medium with a print color predicting program recorded therein, and a profile generating method, which are capable of greatly reducing the number of man-hours required to produce a color chart, to cover a print with a protective film, and to colorimetrically measure the print, without causing a reduction in color reproduction accuracy of a protective-film-covered print.

According to the present invention, there is provided a print color predicting method for predicting color reproduction of a protective-film-covered print, which is made up of a printed object covered by a protective film.

The above print color predicting method comprises an acquiring step for acquiring a spectral reflectance of the printed object, an estimating step for estimating an optical material characteristic value of the protective film, and a predicting step for predicting a spectral reflectance of the protective-film-covered print, using the acquired spectral reflectance of the printed object and the estimated optical material characteristic value of the protective film.

Further, preferably, the acquiring step further acquires a spectral distribution of an observational light source, and the print color predicting method further comprises a calculating step for calculating a colorimetric value of the protective-film-covered print, using the acquired spectral distribution of the observational light source and the predicted spectral reflectance of the protective-film-covered print.

Further, preferably, the estimating step includes the steps of acquiring spectral reflectances of at least two types of grounds, and spectral reflectances in a case where the protective film is disposed on the at least two grounds, obtaining relational expressions based on a predetermined mathematical model for the respective grounds, using the acquired spectral reflectances and an optical material characteristic value of the protective film as an unknown value, obtaining simultaneous equations from the obtained relational expressions, and estimating the optical material characteristic value of the protective film by solving the simultaneous equations.

Further, preferably, the predicting step predicts the spectral reflectance of the protective-film-covered print based on a predetermined mathematical model, using the estimated optical material characteristic value of the protective film.

Further, preferably, the optical material characteristic value of the protective film comprises two of independent optical material characteristic values among a specific reflectance, a scattering coefficient, and an absorption coefficient of the protective film for each of light wavelengths.

According to the present invention, there is also provided a print color predicting apparatus for predicting color reproduction of a protective-film-covered print, which is made up of a printed object covered by a protective film.

The above print color predicting apparatus comprises a first acquisition unit for acquiring a spectral reflectance of the printed object, an estimating unit for estimating an optical material characteristic value of the protective film, and a predicting unit for predicting a spectral reflectance of the protective-film-covered print, using the spectral reflectance of the printed object acquired by the first acquisition unit and the optical material characteristic value of the protective film estimated by the estimating unit.

Further, preferably, the apparatus further comprises a second acquisition unit for acquiring a spectral distribution of an observational light source, and a calculating unit for calculating a colorimetric value of the protective-film-covered print, using the spectral distribution of the observational light source acquired by the second acquisition unit and the spectral reflectance of the protective-film-covered print predicted by the predicting unit.

Further, preferably, the second acquisition unit acquires the spectral reflectance of the printed object from a database.

According to the present invention, there is also provided a computer-readable recording medium recording therein a print color predicting program for enabling a computer to predict color reproduction of a protective-film-covered print, which is made up of a printed object covered by a protective film. The program further enables the computer to function as means for acquiring a spectral reflectance of the printed object, means for estimating an optical material characteristic value of a protective film, and means for predicting a spectral reflectance of the protective-film-covered print, using the acquired spectral reflectance of the printed object and the estimated optical material characteristic value of the protective film.

According to the present invention, there is also provided a profile generating method comprising an acquiring step for acquiring a spectral reflectance of a printed object, an estimating step for estimating an optical material characteristic value of a protective film to cover the printed object, a predicting step for predicting a spectral reflectance of a protective-film-covered print, which is made up of the printed object covered by the protective film, using the acquired spectral reflectance of the printed object and the estimated optical material characteristic value of the protective film, a determining step for predicting the spectral reflectance of the protective-film-covered print based on the spectral reflectance of a color chart as the printed object, and determining spectral reflectances corresponding to respective grid points of a color conversion table based on the spectral reflectance of the protective-film-covered print, and a generating step for generating a profile based on the spectral reflectances corresponding to the respective grid points of the color conversion table.

Further, preferably, the method further comprises a selecting step for selecting a type of a medium that forms the printed object, a type of the protective film, or a type of an observational light source, and the generating step generates the profile, by using the spectral reflectances corresponding to the respective grid points of the color conversion table for the selected medium, the optical material characteristic value of the selected protective film, and a spectral distribution of the selected observational light source.

Further, preferably, the method further comprises an adjusting step for adjusting the optical material characteristic value of the protective film.

In accordance with the print color predicting method, the print color predicting apparatus, the computer-readable recording medium with a print color predicting program recorded therein, and the profile generating method of the present invention, a spectral reflectance of the printed object is acquired, an optical material characteristic value of the protective film is estimated, and a spectral reflectance of the protective-film-covered print is estimated, using the acquired spectral reflectance of the printed object and the estimated optical material characteristic value of the protective film. Therefore, the invention is capable of greatly reducing the number of man-hours required to generate a profile, specifically, the number of man-hours required to print a color chart, to cover the print with a protective film, and to colorimetrically measure the protective-film-covered print, without lowering the color reproduction accuracy of the protective-film-covered print.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 5 is a functional block diagram of a colorimetric value calculator according to the present embodiment;

FIGS. 6A through 6D are views showing by way of example setting screens for setting profile generating conditions according to the present embodiment;

FIG. 8 is a flowchart of a profile generating method according to the present embodiment;

FIG. 12 is a view showing by way of example a screen for adjusting optical material characteristic values of a protective film.

DESCRIPTION OF THE PREFERRED EMBODIMENTS

A print color predicting method and a profile generating method according to an embodiment of the present invention, in relation to a print color predicting apparatus and a printing system that carry out the same, will be described in detail below with reference to the accompanying drawings.

Figure 1:
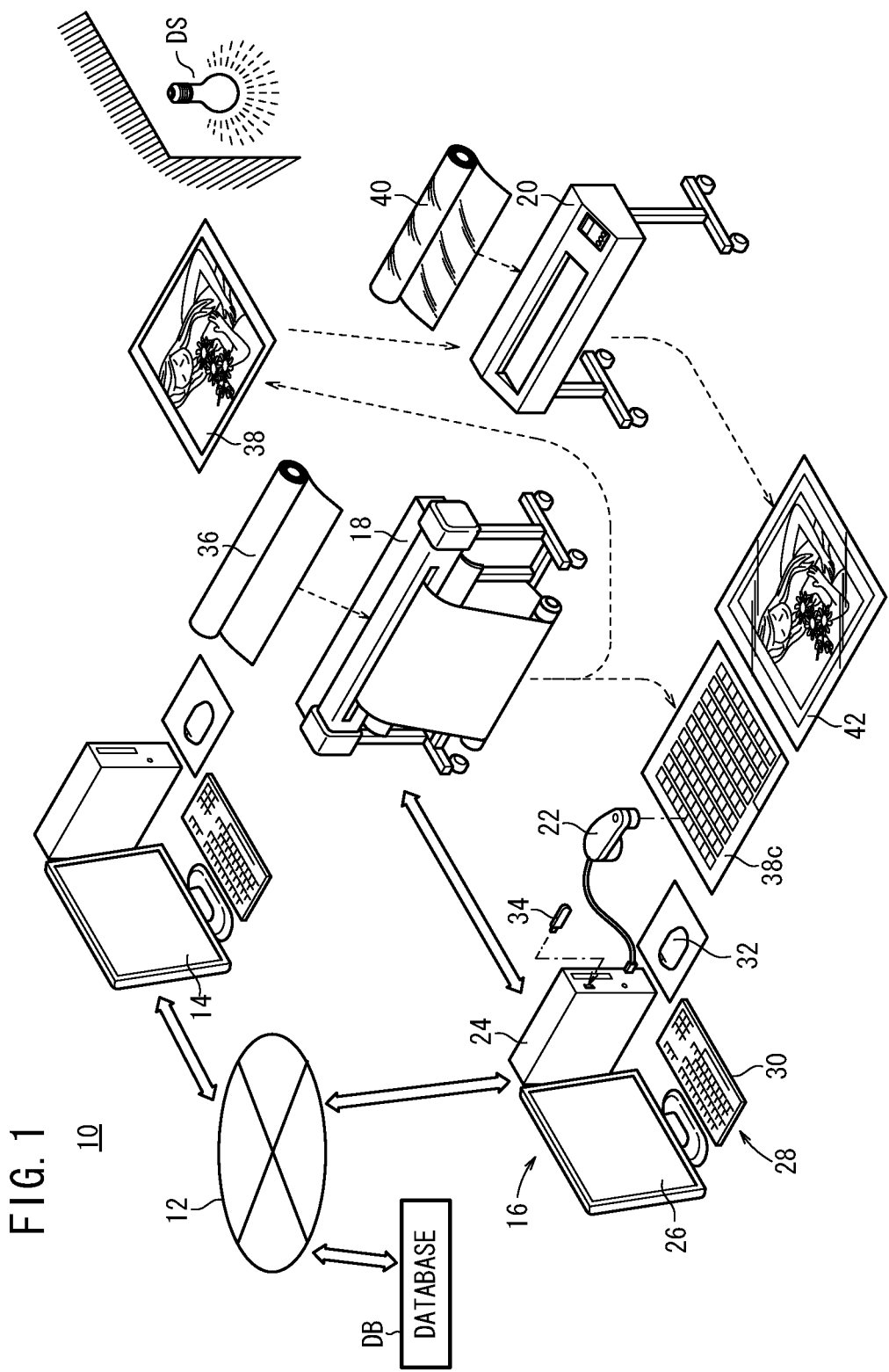
FIG. 1 is a perspective view of a printing system incorporating a print-color-predicting apparatus according to an embodiment of the present invention.

FIG. 1 shows in perspective a printing system 10 incorporating an image processing apparatus 16 as a print color predicting apparatus according to an embodiment of the present invention.

As shown in FIG. 1, the printing system 10 basically comprises a LAN 12, an editing apparatus 14, the image processing apparatus 16 serving as a print color predicting apparatus, a printing machine 18, a laminating apparatus 20, and a colorimeter 22 serving as a first acquisition unit.

The LAN 12 is a network constructed according to communication standards such as Ethernet (registered trademark) or the like. The editing apparatus 14, the image processing apparatus 16, and a database DB are connected to each other over the LAN 12 by a wired or wireless link.

The editing apparatus 14 is capable of editing an arrangement of color images made up of characters, figures, pictures, photos, etc., on each of pages to be printed. The editing apparatus 14 generates electronic manuscripts in a page description language (hereinafter referred to as "PDL"), e.g., 8-bit image data in color channels consisting of four colors (C, M, Y, K) or three colors (R, G, B).

PDL refers to a language that is descriptive of image information, including format information, positional information, color information (including density information), etc., of characters, figures, etc., in a "page" that serves as an output unit for printing, displaying, or the like. Known types of PDL include PDF (Portable Document Format according to ISO32000-1:2008), PostScript (registered trademark) of Adobe Systems Incorporated, and XPS (XML Paper Specification).

A color scanner, not shown, is connected to the editing apparatus 14. The color scanner is capable of optically reading a color original, which is set in position. Therefore, the editing apparatus 14 can acquire color image data in the form of an electronic manuscript from the color scanner based on the color original read thereby.

The image processing apparatus 16 converts an electronic manuscript described by PDL into a raster image (e.g., bitmap image), which will be described later, and then performs a desired image processing process, e.g., a color conversion process, an image scaling process, an image arranging process, etc., on the image data, converts the processed image data into a print control signal that matches the printing process of the printing machine 18, and sends the print control signal to the printing machine 18.

The image processing apparatus 16 comprises a main unit 24 including a CPU, a memory, etc., a display device 26 for displaying color images, and an input device 28 as an input unit including a keyboard 30 and a mouse 32. A portable memory 34, which is capable of freely recording and erasing electronic data, and the colorimeter 22 are connected to the main unit 24 of the image processing apparatus 16.

The printing machine 18 comprises an inkjet printing apparatus for producing a color image based on a combination of standard inks of colors C, M, Y, K (process colors) and optional inks of light colors such as LC, LM, etc., and W (white). The printing machine 18 controls propulsion of inks onto a print medium 36 (a rolled non-printed medium as shown in FIG. 1) based on print control signals received from an external apparatus, e.g., the image processing apparatus 16, in order to print a color image on the print medium 36, thereby producing a printed object 38, which may include a color chart 38c.

The laminating apparatus 20 applies a laminating film 40 as a protective film to the image-formed surface of the printed object 38 and, if necessary, to the reverse surface thereof. The laminating apparatus 20 then heats and presses the laminating film 40 onto the printed object 38 with a heating roller, not shown, thereby producing a protective-film-covered print 42 in which the image-formed surface of the printed object 38 is protected by the laminating film 40.

The print medium 36 may comprise a paper medium such as synthetic paper, thick paper, aluminum-evaporated paper or the like, a resin medium such as vinyl chloride, PET or the like, or tarpaulin paper or the like. The protective film, which is applied to the printed object 38, is not limited to a laminating film 40, but may be formed from a liquid, a varnish, a transparent ink, a clear toner or the like, or may comprise a protective sheet such as an acrylic sheet or the like.

The colorimeter 22 measures colorimetric values of an object to be measured. Colorimetric values refer not only to tristimulus values X, Y, Z, the coordinates L*, a*, b* of a uniform color space, etc., but also to a distribution of optical material characteristic values (hereinafter referred to as "spectral data") with respect to wavelengths, e.g., a spectral radiance distribution (spectral distribution), a spectral sensitivity distribution, spectral reflectivity, or spectral transmittance.

The protective-film-covered print 42, which is obtained in this manner, is displayed at a given site under a light source DS, which serves as an observational light source.

Figure 2:
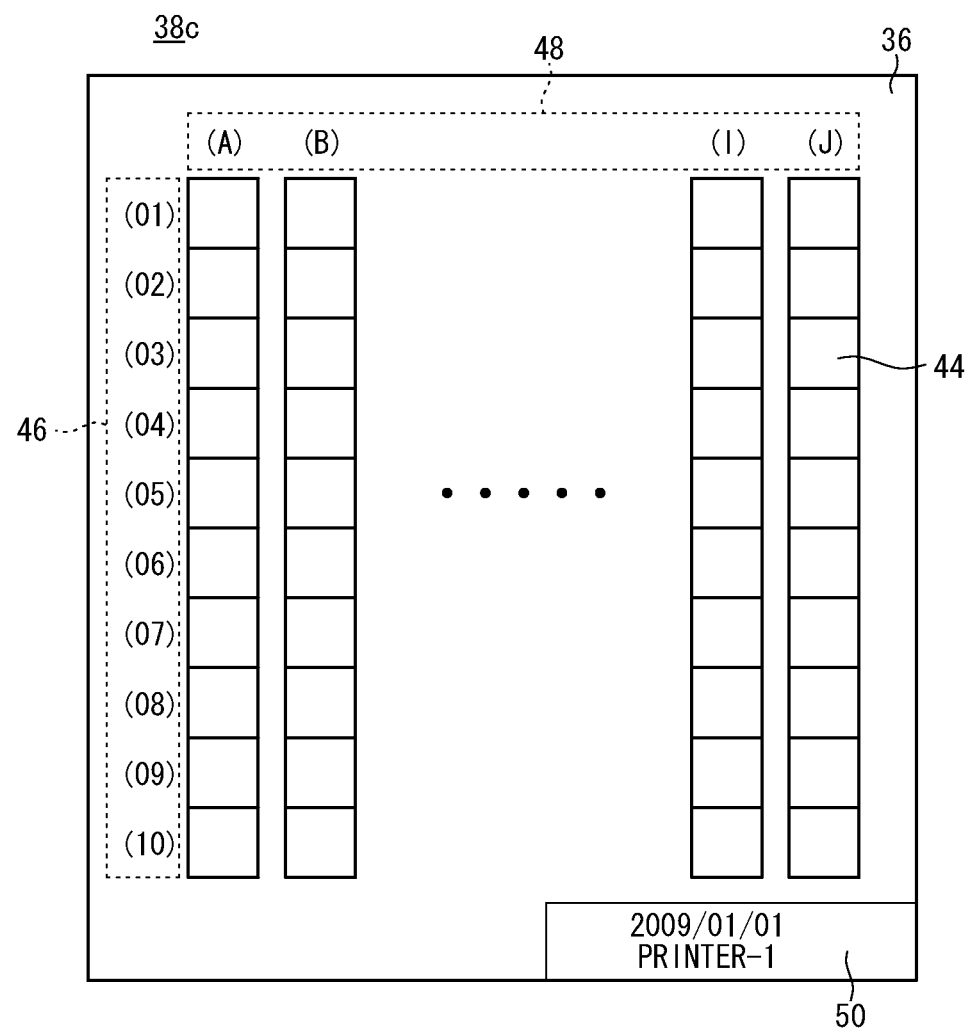
FIG. 2 is a front elevational view of a color chart according to the present embodiment.

FIG. 2 is a front elevational view of the color chart 38c according to the present embodiment.

The color chart 38c shown in FIG. 2 comprises one hundred color patches 44 of different colors, which are substantially identical in shape and arranged in rows and columns, a sequence of numbers 46 and a sequence of alphabetical letters 48 for identifying positions of the color patches 44 along directions of the rows and columns, and print information 50 for identifying conditions for printing the color chart 38c, all of which is printed on the print medium 36.

The color patches 44 are arranged in a matrix having 10 vertical columns and 10 horizontal rows, the color patches 44 being spaced from each other by given intervals. Colors of the respective color patches 44 are set to given values within a range of signal levels of C, M, Y, K values (a percentage range from 0% to 100% or an 8-bit gradation range from 0 to 255).

The sequence of numbers 46 represents a vertical string of characters ranging from (01) to (10) positioned in alignment with and to the left of respective rows of color patches 44. The sequence of alphabetical letters 48 represents a horizontal string of characters ranging from (A) to (J) positioned in alignment with and at the top of respective columns of color patches 44.

The print information 50 is printed on the print medium 36 and represents the type and serial number, or a registered name of the printing machine 18, a print mode (to be described later), the type of print medium 36, a print date, etc.

Figure 3:
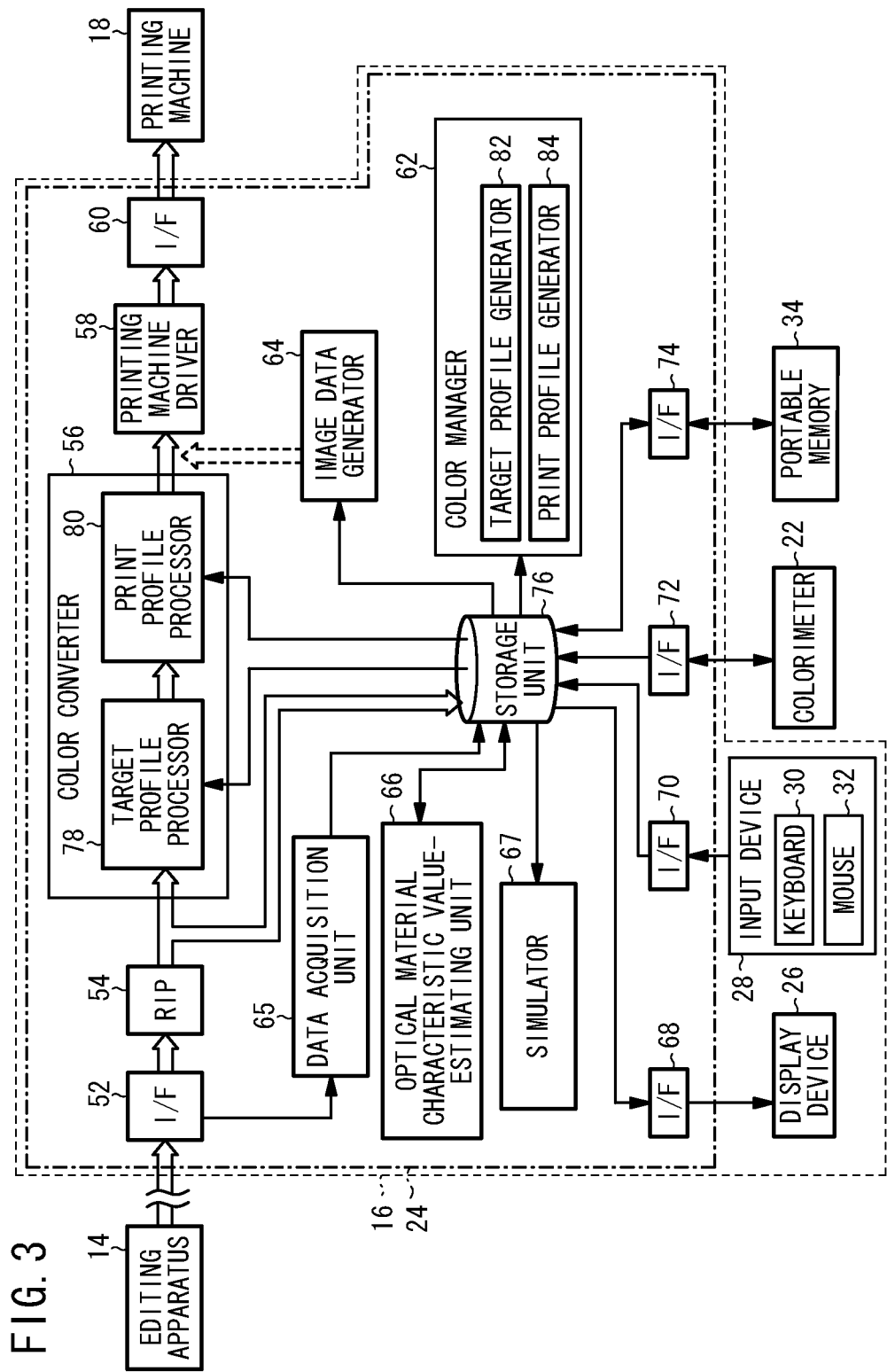
FIG. 3 is a functional block diagram of a print-color-predicting apparatus according to the present embodiment.

FIG. 3 is a functional block diagram of the image processing apparatus 16 according to the present embodiment. In FIG. 3, an electronic manuscript is supplied along directions indicated by the outlined solid-line arrows, image data for the color chart 38c is supplied along directions indicated by the outlined broken-line arrows, and various other data is supplied along directions indicated by the solid-line arrows.

As shown in FIG. 3, the main unit 24 of the image processing apparatus 16 includes an I/F 52 for entering an electronic manuscript supplied from the editing apparatus 14, a RIP (Raster Imaging Processor) 54 for converting the PDL format of the electronic manuscript supplied from the I/F 52 into a raster format, a color converter 56 for performing a predetermined color conversion process on the converted C, M, Y, K values (or R, G, B values) of the electronic manuscript from the RIP 54 in order to produce image data of new C, M, Y, K values, a printing machine driver 58 for converting the image data of the new C, M, Y, K values produced by the color converter 56 into print control signals (ink propulsion control data) that match the printing process of the printing machine 18, and another I/F 60 for outputting the print control signals generated by the printing machine driver 58 to the printing machine 18.

The main unit 24 also includes a color manager 62 for managing profiles for different printing machines 18, an image data generator 64 for generating image data to print the color chart 38c, a data acquisition unit (first acquisition unit, second acquisition unit) 65 for acquiring spectral data of the print medium 36, the laminating film 40, and/or the light source DS from an external apparatus, an optical material characteristic value-estimating unit (estimating unit) 66 for estimating optical material characteristic values of the laminating film 40, a simulator 67 for calculating optical material characteristic values of the laminating film 40 based on several variables, an I/F 68 connected to the display device 26, an I/F 70 connected to the input device 28 including the keyboard 30 and the mouse 32, an I/F 72 connected to the colorimeter 22, and an I/F 74 connected to the portable memory 34.

The main unit 24 also includes a storage unit 76 for storing various data supplied from various components of the main unit 24, and for supplying the stored data to various components of the main unit 24. The storage unit 76 is connected to the RIP 54, the color converter 56, the color manager 62, the image data generator 64, the data acquisition unit 65, the optical material characteristic value-estimating unit 66, the simulator 67, the I/F 68, the I/F 70, the I/F 72, and the I/F 74.

The color converter 56 comprises a target profile processor 78 for converting device-dependent data into device-independent data, and a print profile processor 80 for converting device-independent data into device-dependent data. Device-dependent data refer to data defined in terms of C, M, Y, K values, R, G, B values, or the like, for appropriately driving various devices. Device-independent data refer to data defined in terms of a display system, such as an HSV (Hue-Saturation-Value) system, an HLS (Hue-Lightness-Saturation) system, a CIELAB system, a CIELUV system, an XYZ system, or the like.

The color manager 62 comprises a target profile generator 82 for generating target profiles for respective printing machines 18, and a print profile generator 84 for generating print profiles for respective printing machines 18.

The RIP 54 can perform various image processing processes, including an image scaling process depending on resolution, etc., of the printing machine 18, and a rotating and inverting process depending on a printing format utilized when an electronic manuscript is converted into raster image data.

From the C, M, Y, K values, the printing machine driver 58 generates ink propulsion control data corresponding to ink colors (C, M, Y, K, LC, LM, or W). The ink propulsion control data are related to operational details of the printing machine 18, which serve to properly control the ejection of the inks (ink ejection ON/OFF, ink dot diameters, etc.) of the printing machine 18. In this process, the printing machine driver 58 has to convert from an 8-bit multiple-gradation image into a low-gradation image such as a binary image to generate the ink propulsion control data. For such a conversion, the printing machine driver 58 may use a known algorithm, such as a dither matrix method, an error diffusion method, or the like.

The target profile processor 78 or the print profile processor 80 is capable of correcting a profile depending on a print mode of the printing machine 18. The print mode refers to various print settings, such as the number of nozzles of the print head, the timing (unidirectional/bidirectional) of ink ejection during scanning of the print head, the number of passes, the number and type of inks used in the printing machine 18, and an algorithm for generating ink ejection control data, etc.

The main unit 24 has a controller (not shown) comprising a CPU, etc., for controlling all of the image processing processes described above. More specifically, the controller controls not only operation of various components of the main unit 24, e.g., reading data from and writing data to the storage unit 76, but also transmission of display control signals via the I/F 68 to the display device 26, and acquisition of colorimetric data from the colorimeter 22 via the I/F 72.

The image processing apparatus 16 according to the present embodiment is constructed as described above. Image processing processes or other functions described above can be performed according to application software (programs), which is stored in the storage unit 76, and which operates, for example, under the control of basic software (operating system).

The aforementioned program is recorded in a computer readable recording medium (for example, the portable memory 34 shown in FIG. 1). The program, which is stored in the recording medium, may be read in and executed by a computer system. The term "computer system" as used herein may include an OS (operating system) or hardware embodied in peripheral devices or the like. Such a computer readable medium may be a portable storage device such as a flexible disk, magneto-optical disk, ROM, CD-ROM or the like, or a hard disk that is internal to the computer system. The computer readable medium may hold programs dynamically and for a short time period, as in the case of a transmission line, in which programs are transmitted to the computer over a communications circuit made up of an internet network, a telephone circuit line, or the like, and may include holding of programs for a certain length of time, as in the case of a volatile memory internal to a server/client type of computer system.

Figure 4:
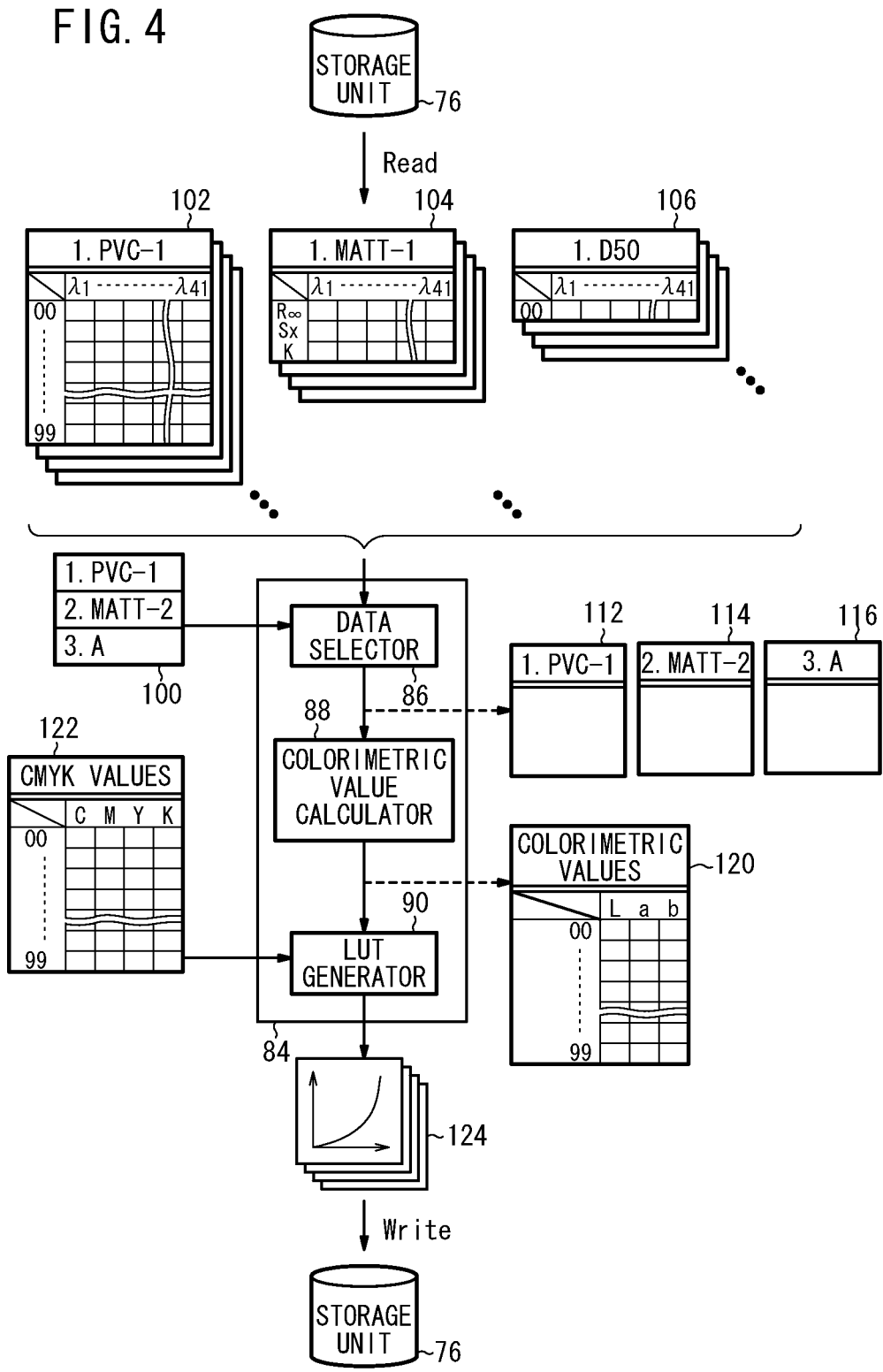
FIG. 4 is a functional block diagram of a print profile generating unit according to the present embodiment.

FIG. 4 is a functional block diagram of the print profile generator 84 according to the present embodiment.

The print profile generator 84 basically comprises a data selector 86, a colorimetric value calculator 88, and a LUT generator 90.

The data selector 86 selects spectral data of a print medium under profile generating conditions (hereinafter referred to as "first spectral data 112"), based on setting data 100, and a group 102 of spectral data of print mediums read out from the storage unit 76. Also, the data selector 86 selects spectral data of a laminating film under profile generating conditions (hereinafter referred to as "second spectral data 114"), based on setting data 100 and a group 104 of spectral data of laminating films read out from the storage unit 76. Also, the data selector 86 selects spectral data of an observational light source under profile generating conditions (hereinafter referred to as "third spectral data 116"), based on setting data 100 and a group 106 of spectral data of observational light sources read out from the storage unit 76. The setting data 100 represent types of print mediums 36, laminating films 40, and types of light sources DS that are set (input) by the operator, and which serve as setting data relative to the profile generating conditions.

The colorimetric value calculator 88 calculates colorimetric value data 120 under profile generating conditions based on the first, second, and third spectral data 112, 114, 116, which are selected by the data selector 86.

The LUT generator 90 generates a LUT 124 under profile generating conditions based on the colorimetric value data 120 calculated by the colorimetric value calculator 88, and C, M, Y, K value data 122 corresponding to the respective color patches 44 (see FIG. 2).

In the present embodiment, spectral data are given respectively in association with one hundred color patches 44 whose patch numbers range from 0 to 99. The light wavelengths have forty-one data $\lambda_1$ through $\lambda_{41}$ associated therewith. For example, the light wavelengths are represented by $\lambda_1=400$ nm, . . . , $\lambda_{41}=800$ nm at intervals of 10 nm.

FIG. 5 is a functional block diagram of the colorimetric value calculator 88 according to the present embodiment.

The colorimetric value calculator 88 basically comprises a spectral reflectance predicting unit (predicting unit) 88a and a Lab calculator (calculating unit) 88b.

The spectral reflectance predicting unit 88a predicts the spectral reflectance (hereinafter referred to as "fourth spectral data 118") of the protective-film-covered print 42 based on the first and second spectral data 112, 114 supplied from the data selector 86, using a known Kubelka-Munk theoretical model, which will be described later.

The first spectral data 112 refer to the spectral reflectance of the print medium 36, and the second spectral data 114 refer to a specific reflectance, a scattering coefficient, and an absorption coefficient (optical material characteristic values) of the laminating film 40, for each of the light wavelengths.

The Lab calculator 88b calculates the colorimetric value data 120 under profile generating conditions, based on the third spectral data 116 supplied from the data selector 86, the fourth spectral data 118 predicted by the spectral reflectance predicting unit 88a, and a color matching function (spectral data in view of visual characteristics of a standard observer), not shown.

FIGS. 6A through 6D are views showing by way of example setting images for setting profile generating conditions according to the present embodiment.

A setting image 130 has three pull-down menus 132, 134, 136, a textbox 138, and buttons 140, 142 labeled "GENERATE" and "CANCEL", respectively, arranged successively downward.

The setting image 130 includes a string of letters indicating "MEDIUM" on the left side of the pull-down menu 132. When the operator operates the mouse 32 in a certain way, a selection column 144 also is displayed beneath the pull-down menu 132, as shown in FIG. 6B, with a scroll bar 146 added to the right side of the selection column 144.

The setting image 130 includes a string of letters indicating "LAMINATING FILM" on the left side of the pull-down menu 134. When the operator operates the mouse 32 in a certain way, a selection column 148 also is displayed beneath the pull-down menu 134, as shown in FIG. 6C, with a scroll bar 150 added to the right side of the selection column 148.

The setting image 130 includes a string of letters indicating "LIGHT SOURCE" on the left side of the pull-down menu 136. When the operator operates the mouse 32 in a certain way, a selection column 152 also is displayed beneath the pull-down menu 136, as shown in FIG. 6D, with a scroll bar 154 added to the right side of the selection column 152.

The setting image 130 includes a string of letters indicating "PROFILE NAME" on the left side of the textbox 138. The operator can enter character information into the textbox 138 through operation of the keyboard 30.

The printing system 10 according to the present embodiment basically is constructed as described above. Operations of the printing system 10 will be described below.

Figure 7:
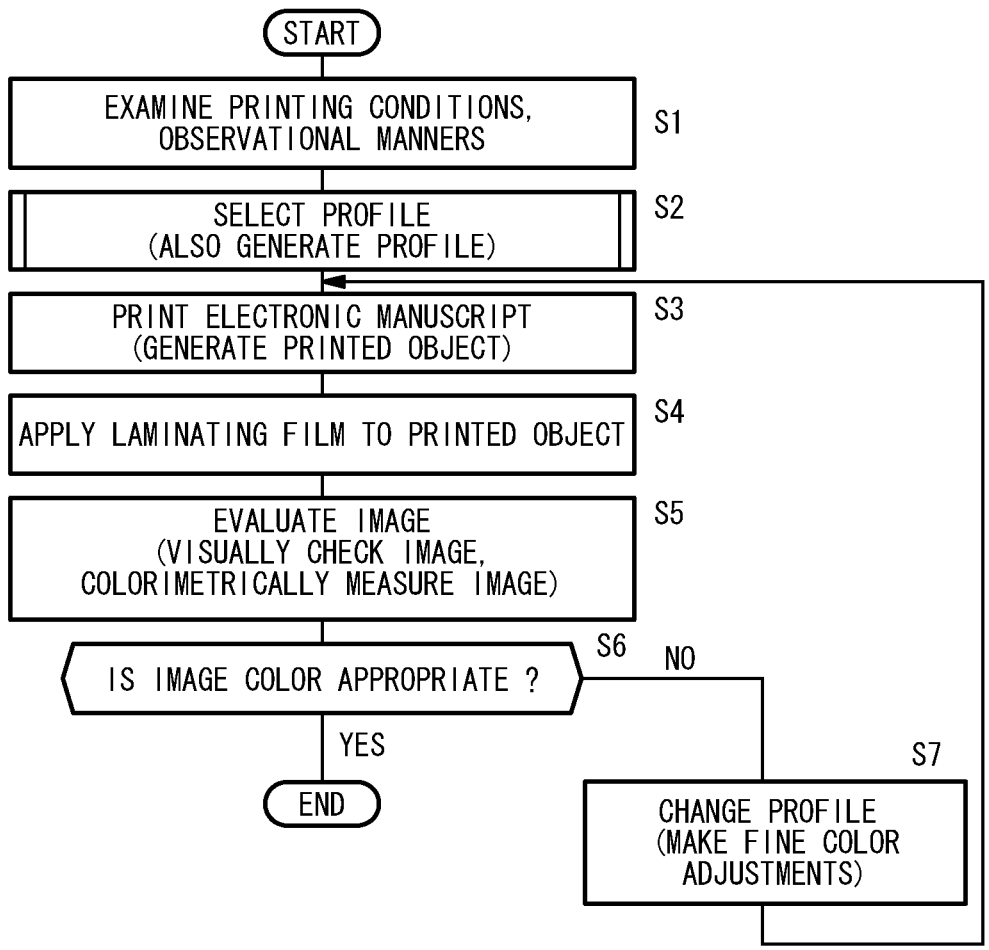
FIG. 7 is a flowchart of a sequence for obtaining an appropriate color protective-film-covered print using the printing system according to the present embodiment.

FIG. 7 is a flowchart of a sequence for producing a protective-film-covered print 42 having appropriate colors, using the printing system 10 according to the present embodiment. A process for producing the protective-film-covered print 42 will be described below, mainly with reference to FIG. 1.

The operator examines printing conditions and observational manners of a protective-film-covered print 42 to be produced (step S1). Such printing conditions refer to the type of printing machine 18 that is used to produce the protective-film-covered print 42, the type of print medium 36, the type of laminating film 40, and the print mode referred to above, etc. Observational manners refer not only to attributes (type of light source, spectral data) of the light source DS as an observational light source, but also to the type of image on the protective-film-covered print 42 to be observed. The type of image refers to a reflective image (an image observed with a reflective light source used as a main light source), a transmissive image (an image observed with a transmissive light source used as a main light source), and a combination image (an image observed with a reflective light source and a transmissive light source used as main light sources).

Then, the operator selects a profile suitable for the printing machine 18 (step S2). Normally, a target profile or a print profile is stored in the storage unit 76 of the main unit 24. If a profile suitable for the printing machine 18 has not been registered, i.e., is not stored in the storage unit 76, then a print profile can be generated separately.

Then, an electronic manuscript is printed using the printing machine 18, thereby producing a printed object 38 (step S3). Thereafter, the printed object 38 is laminated (step S4).

More specifically, the laminating film 40 is applied to the image-formed surface of the printed object 38 and, if necessary, the reverse surface thereof. The laminating film 40 then is heated and pressed by a heating roller (not shown) of the laminating apparatus 20, thereby producing a protective-film-covered print 42. The produced protective-film-covered print 42 has an increased level of abrasion resistance and toughness.

Then, the operator evaluates the color image of the protective-film-covered print 42 (step S5), and determines whether or not the color of the color image is appropriate (step S6). The operator may evaluate the color of the color image in order to determine whether desired hues are obtained, for example, either by visually checking the color image based on observation of an overall or partial appearance of the color image, or by obtaining a colorimetric value of a certain area of the protective-film-covered print 42 with the colorimeter 22, and determining whether or not the obtained colorimetric value falls within a desired range.

If, as a result of such image evaluation, the operator judges that the color of the color image of the protective-film-covered print 42 is not suitable, then the operator changes the profile in order to make fine adjustments to the color of the color image (step S7). More specifically, the operator may reset or regenerate the profile, may make fine adjustments to the profile (i.e., may correct the presently set profile), or may make corrections to the print data of the printed electronic manuscript.

Thereafter, an electronic manuscript is printed and colors of the color image itself are evaluated repeatedly (steps S3 through S7) until a protective-film-covered print 42 having a desired color is obtained.

An image processing sequence of the image processing apparatus 16 for printing an electronic manuscript (step S3) will be described in detail below with reference to FIG. 3.

When an electronic manuscript in PDL format supplied from the editing apparatus 14 is input to the image processing apparatus 16 via the LAN 12 and the I/F 52, the electronic manuscript is converted into 8-bit C, M, Y, K raster data (device-dependent image data) by the RIP 54. Such 8-bit C, M, Y, K raster data are then converted into L*, a*, b* data (device-independent image data) by the target profile processor 78. Such L*, a*, b* data are then converted into C, M, Y, K value data (device-dependent image data) by the print profile processor 80. The C, M, Y, K value data are then converted into a print control signal (ink ejection control data) by the printing machine driver 58. The print control signal is supplied to the printing machine 18 from the printing machine driver 58 via the I/F 60. Thereafter, the printing machine 18 produces a desired printed object 38 based on the print control signal.

In this embodiment, target profiles and print profiles corresponding to a plurality of set conditions have been stored in the storage unit 76 beforehand. One of the target profiles and one of the print profiles are supplied selectively to the target profile processor 78 and the print profile processor 80, depending on various preset conditions. If such profiles are appropriately corrected in view of the print mode or the like of the printing machine 18, then more appropriate color conversion processes can be performed.

The outlined workflow, for producing an appropriate protective-film-covered print 42 with the printing system 10 according to the present embodiment, has been described above. A process for generating a profile (step S2) will be described in detail below with reference to the flowchart shown in FIG. 8.

The operator confirms whether or not the type of print medium 36 used for producing the printed object 38 has been registered (step S21).

If not yet registered, then spectral data of the print medium 36 are acquired (step S22). For example, the operator prepares the portable memory 34, which stores spectral data of the print medium 36 therein, and connects the portable memory 34 to the main unit 24 of the image processing apparatus 16. Spectral data stored in the portable memory 34 are automatically or manually transferred as new data to the storage unit 76. Alternatively, spectral data of the print medium 36 may be managed by the database DB (see FIG. 1) and, if necessary, acquired therefrom and transferred to the storage unit 76. For example, desired spectral data may be read out from the database DB, acquired by the data acquisition unit 65 via the LAN 12 and the I/F 52, and temporarily stored in the storage unit 76.

Further, alternatively, spectral data of the print medium 36 may be acquired directly from the print medium 36 using the colorimeter 22, which is connected to the main unit 24. A process of directly acquiring spectral data of the print medium 36 using the colorimeter 22 will be described, mainly with reference to FIG. 3.

The operator enters a request to print the color chart 38c into a setting image (not shown), which is displayed on the display device 26. In response to the request, the image data generator 64 of the main unit 24 generates image data (C, M, Y, K values) for printing the color chart 38c, and supplies the generated image data to the printing machine driver 58. The printing machine driver 58 then converts the image data into a print control signal, which is supplied to the printing machine 18 in the same manner as when an electronic manuscript is printed. In response to the print control signal, the printing machine 18 prints the color chart 38c (see FIG. 2).

The C, M, Y, K value data 122 (see FIG. 4), which correspond to pixels of the respective color patches 44, are stored in the storage unit 76 in advance, and are read from the storage unit 76 when the image data generator 64 generates image data.

The operator measures spectral data of the color patches 44 that make up the color chart 38c (see FIG. 2) using the colorimeter 22, which is connected to the image processing apparatus 16. At this time, the laminating apparatus 20 does not perform the laminating process. It is preferable for the sequence for colorimetrically measuring the color patches 44, e.g., (01) through (10) on column (A) and (01) through (10) on column (B), to be determined in advance using the numbers 46 and the alphabetical letters 48 shown in FIG. 2. When the operator has completed the colorimetric measurement, the spectral data corresponding to the color patches 44 are stored in the storage unit 76 via the I/F 72, in relation to the type of print medium 36 (see FIG. 3).

After spectral data have been saved in the storage unit 76, a new type of print medium 36 can be selected from the selection column 144 of the pull-down menu 132 shown in FIG. 6B. In FIG. 6B, "PVC (A)" (where "PVC" refers to polyvinyl chloride") is selected.

The type of print medium 36 is thus established (step S23).

The operator then confirms whether or not the type of laminating film 40 to be applied to the printed object 38 has been registered (step S24). If not yet registered, then spectral data of the laminating film 40 are acquired (step S25). As mentioned above, the portable memory 34 may store spectral data of the laminating film 40, and the operator may acquire spectral data of the laminating film 40 from the portable memory 34. Otherwise, the operator may acquire spectral data of the laminating film 40 from the database DB. Further, the operator may acquire spectral data of the laminating film 40 that are estimated by the optical material characteristic value-estimating unit 66 (see FIG. 3).

After spectral data have been saved in the storage unit 76, a new type of laminating film 40 can be selected from the selection column 148 of the pull-down menu 134 shown in FIG. 6C. In FIG. 6C, "MATT B" (where "MATT" refers to a non-glossy film) is selected.

The type of laminating film 40 is thus established (step S26).

The operator then confirms whether or not the type of observational light source DS has been registered (step S27). If not yet registered, then spectral data of the light source DS are acquired (step S28). The portable memory 34 may store spectral data of the light source DS, and the operator may acquire spectral data of the light source DS from the portable memory 34. Otherwise, the operator may acquire spectral data of the light source DS from the database DB.

After spectral data have been saved in the storage unit 76, a new type of light source DS can be selected from the selection column 152 of the pull-down menu 136 shown in FIG. 6D. In FIG. 6D, a light source "A" is selected.

The type of observational light source DS is thus established (step S29).

Finally, profile generating conditions including the type of print medium 36 established in step S23, the type of laminating film 40 established in step S26, and the type of light source DS established in step S29 are saved (step S30).

After a profile name to be generated has been entered and registered in the textbox 138 shown in FIG. 6A, the operator presses the "GENERATE" button 140. Then, various settings (setting data 100) are now input through the input device 28 to the main unit 24, whereupon such data are automatically stored in the storage unit 76.

Thereafter, as shown in FIG. 4, the first, second, and third spectral data 112, 114, 116, which are associated with the setting data 100, are selected by the data selector 86, from among the setting data 100 supplied from the storage unit 76, the group 102 of spectral data of print mediums, the group 104 of spectral data of laminating films, and the group 106 of spectral data of observational light sources.

Further, as shown in FIG. 5, the spectral reflectance predicting unit 88a constituting part of the colorimetric value calculator 88 predicts the fourth spectral data 118 (the spectral reflectance of the protective-film-covered print 42) based on the first and second spectral data 112, 114, using a Kubelka-Munk theoretical model.

More specifically, based on the following expression (1), the spectral reflectance R of the protective-film-covered print 42 is predicted. Although it is understood that each of the variables is a function of optical wavelength, for purposes of simplification, explanations of such functions, which are well known in the art, have been omitted.

$$R = [(R_g - R_\infty)/R_\infty - R_\infty(R_g - 1/R_\infty) \exp\{Sx(1/R_\infty - R_\infty)\}] / [(R_g - R_\infty) - (R_g - 1/R_\infty) \exp\{Sx(1/R_\infty - R_\infty)\}] \quad (1)$$

In the above expression (1), "$R_g$" represents the spectral reflectance (first spectral data 112) of the printed object 38 alone, "$R_\infty$" represents the specific spectral reflectance of the laminating film 40, "S" represents a scattering coefficient per unit thickness of the laminating film 40, and "x" represents the actual thickness of the laminating film 40 (see "New Contribution to the Optics of Intensely Light-Scattering Materials. Part I", Journal of the Optical Society of America, Volume 38, Number 5, pp 448-457, May, 1948).

The Lab calculator 88b calculates the colorimetric value data 120 under the profile generating conditions, based on the third spectral data 116 and the fourth spectral data 118. The colorimetric value data 120 under the profile generating conditions represent coordinates L*, a*, b*, which are estimated based on measured data at a time when the protective-film-covered print 42 is observed under the light source DS.

More specifically, tristimulus values X, Y, Z of the color patches 44 correspond to values, which are produced by multiplying the spectral radiation distribution of the light source DS, the spectral reflectance of the protective-film-covered print 42, and the color matching function, and integrating the product within a range of visible wavelengths. Coordinates L*, a*, b* of the color patches 44 are calculated according to a given computational expression as colorimetric value data 120, based on the tristimulus values X, Y, Z. According to the present embodiment, since one hundred color patches 44 are measured, one hundred sets of coordinates L*, a*, b* are obtained.

The LUT generator 90 shown in FIG. 4 generates the LUT 124 for converting the three-dimensional data (L*, a*, b*) into four-dimensional data (C, M, Y, K), based on an association between one hundred sets of colorimetric value data 120 (L*, a*, b*) and one hundred sets of C, M, Y, K value data 122.

That is, the spectral reflectances corresponding to the respective grid points of a color conversion table are determined based on the spectral reflectances of the protective-film-covered print 42. A profile (including the LUT 124 as data) of the protective-film-covered print 42 is generated based on the determined spectral reflectances.

With the above arrangement, once spectral data of the print medium 36, the laminating film 40, and the light source DS have been acquired, a print profile can be estimated without the need for producing a protective-film-covered print 42 itself. Accordingly, the number of the series of processes for generating a profile, including the printing process of the color chart 38c by the printing machine 18 (including a wait time), the laminating process carried out by the laminating apparatus 20, and the colorimetric measurement process using the colorimeter 22, can be reduced.

For example, if the print medium 36 is available in $N_1$ types, the laminating film 40 in $N_2$ types, and the light source DS in $N_3$ types, then a conventional profile generating method has required ($N_1 \times N_2$) separate printing and laminating processes, and ($N_1 \times N_2 \times N_3$) separate colorimetric measurement processes. According to the present invention, the profile generating method requires no laminating processes, and only $N_1$ printing and colorimetric measurement processes. Therefore, the profile generating method according to the present invention is more advantageous, in that the total number of types $N_1$, $N_2$, $N_3$ is greater.

Print profiles corresponding to profile generating conditions are stored in the storage unit 76 (see FIG. 3) in advance. When there is a request for printing an electronic manuscript, the stored print profiles are read selectively from the storage unit 76 based on setting conditions. Since a print profile, having once been generated, does not need to be generated again, the processing time required for image processing is shortened.

Alternatively, each time a request is made for printing an electronic manuscript, a print profile corresponding to print setting conditions may be generated and supplied to the color converter 56. In this manner, the amount of data stored in the storage unit 76 can be reduced.

An outlined flowchart for generating a profile (step S2 in FIG. 8) according to the present embodiment has been described above. Next, a method of estimating optical material property values of a laminating film 40 will be described in detail below with reference to FIGS. 9 to 11.

Specifically, a method shall be explained in detail for estimating experimentally the unknown variables for $R_\infty$ (specific reflectance) and Sx (scattering coefficient), which are optical physical values of the laminating film 40.

Figure 9A:
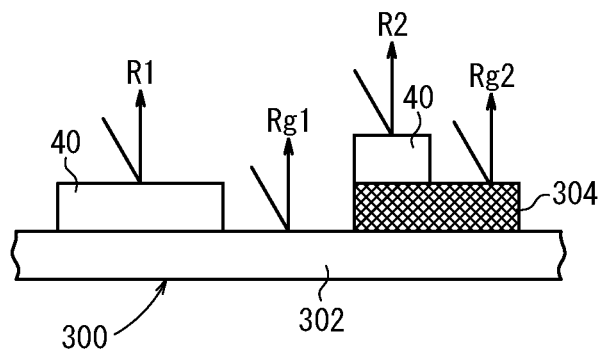
FIGS. 9A and 9B are outline views in cross section of a measurement specimen made for the purpose of estimating optical material property values of a protective film.

FIG. 9A is an outline view in cross section of a measurement specimen 300, made for the purpose of estimating optical material characteristic values of the laminating film 40.

The measurement specimen 300 comprises a substrate 302 having a spectral reflectance of $Rg_1$ made up from a white non-transparent body, a black material 304, and the laminating film 40, which serves as an object to be measured.

An operator, using the colorimeter 22, measures the spectral reflectance of each location on the measurement specimen 300. As a result, measurement values are obtained of the spectral reflectance $R_1$ when the laminating film 40 is applied to cover the substrate 302, the spectral reflectance $Rg_2$ when the black material 304 is disposed on the substrate 302, and the spectral reflectance $R_2$ ($R_1 > R_2$) when the substrate 302 is covered by the laminating film 40 with the black material 304 intervening therebetween.

These measurement values are stored initially in the storage unit 76 via the I/F 72 provided in the main unit 24 of the image processing apparatus 16 shown in FIG. 3. Thereafter, the measurement values are supplied to the optical material characteristic value-estimating unit 66, in which a computational process is carried out according to the following expressions.

The specific reflectance $R_\infty$ of the laminating film 40 is calculated by mathematical analysis, as follows (also see, "Paper Properties and their Evaluation Methods with Latest Relevant Testing Standards", Imaging Today: 'What is Paper', Journal of the Imaging Society of Japan, 150, 2004):

$$R_\infty = \{C - \sqrt{(C^2-4)}\}/2 \qquad (2)$$

where $$C = \{(R_1+Rg_2)(R_2 \cdot Rg_1 - 1) - (R_2+Rg_1)(R_1 \cdot Rg_2 - 1)\}/(R_2 \cdot Rg_1 - R_1 \cdot Rg_2) \qquad (3)$$

In the case that $R_1 < R_2$, the subscripts 1 and 2 in the above expression (3) are reversed.

The specific reflectance $R_\infty$ is a reflectance for a case in which it is assumed that the thickness of the test specimen is unlimited. Thus, if the test specimen can be made by superimposing a plurality of the laminating films 40 of the same type, the specific reflectance $R_\infty$ may be acquired by direct measurement.

Next, using the actual measured value $R_n$ (n=1 or 2), the actual measured value $Rg_n$ (n=1 or 2), and $R_\infty$ as calculated by expression (2), the scattering coefficient S and the thickness x of the laminating film 40 are calculated as follows by expression (4), $$S \cdot x = \ln\left[\{(R_\infty - Rg_n)(1/R_\infty - R_n)\}/\{(R_\infty - R_n)(1/R_\infty - Rg_n)\}\right]/(1/R_\infty - R_\infty) \qquad (4)$$

where S is the scattering coefficient per unit thickness, and x is the actual thickness of the laminating film 40. See, "Basics and Applied Technologies of Color Representation", page 88, equation (21) (Triceps). Concerning the definition of the scattering coefficient, although for purposes of simplification Sx (=S·x) has been defined as a scattering coefficient (i.e., as one variable) at a given film thickness x, either S or Sx may be used. Further, the same holds true as well for the absorption coefficient K.

Figure 9B:
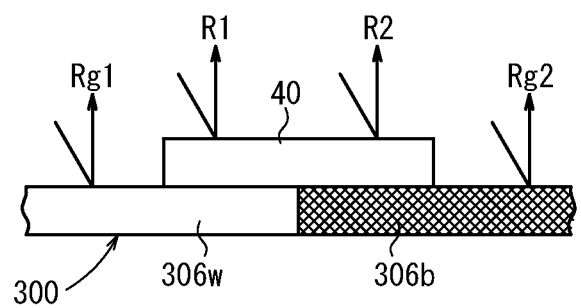

As shown in FIG. 9B, the measurement specimen 300 may be made by arranging a white ground (substrate) 306w and a black ground (substrate) 306b close together, and laminating the laminating film 40 partially on both the grounds 306w, 306b. According to this arrangement, the measurement specimen 300 can be made easily, without using the laminating apparatus 20 (see FIG. 1).

Nevertheless, if the measurement specimen 300 is made using the laminating apparatus 20 for a laminating process, then the estimate accuracy of the optical material characteristic values of the laminating film 40 will be improved since the structure of the measurement specimen 300 will be closer to actual structure of the protective-film-covered print 42.

In this way, the optical material characteristic values (specific reflectance $R_\infty$ and scattering coefficient Sx) of the laminating film 40 can be estimated by the measurement specimen 300 that is made up of two types of grounds (e.g., grounds 306w, 306b) and the laminating film 40.

If, however, a ground other than these two types of grounds 306w, 306b is used, the estimated optical material characteristic values might not be able to be used due to the difference in material characteristics on the surface or the like. In other words, the optical material characteristic values will change depending on the combination of a laminating film 40 and another ground, so that the color reproduction accuracy may not be assured.

Basically, the optical material characteristic values can be estimated from two types of grounds at minimum. However, it would be much preferable to use measurement specimens 300 that are prepared from a combination of n (n>2) types of grounds and a laminating film 40, for estimating optical material characteristic values (specific reflectance $R_\infty$ and scattering coefficient Sx) of the laminating film 40.

Specifically, specimens (not shown) are prepared such that one type of laminating film 40 covers n types of grounds each having different spectral reflectance values $Rg_n$.

Spectral reflectance values $Rg_n$ and $R_n$ are obtained before and after applying the laminating film 40 to cover each of the grounds. Thereafter, a non-linear equation is formulated according to the expression (1), with two unknown values of the specific reflectance $R_\infty$ and the scattering coefficient Sx. Then, one relational expression is obtained from one type of ground, and thus n types of grounds will result in n simultaneous equations.

Usually, the solving of simultaneous equations means that unknown values are uniquely specified. On the other hand, in this case, the n simultaneous equations are redundant since there are only two unknown values. However, it is possible to estimate unknown values that satisfy the simultaneous equations optimally. Thus, it is assumed that the solving of simultaneous equations can include a case where unknown values are estimated optimally based on a predetermined evaluation function.

For example, if the right-hand side of the expression (1) is assumed to be $KM(Rg_i, R_\infty, Sx)$, expression (5) as an evaluation function can be provided as follows:

$$Err = \Sigma\{R_i - KM(Rg_i, R_\infty, Sx)\}^2 \qquad (5)$$

where the symbol "Σ" means the summation when the variable "i" ranges from 1 to n. Values ($R_\infty$, Sx) that minimize the value Err of the expression (5) can be estimated values.

To acquire the estimated values ($R_\infty$, Sx), a known non-linear optimization method can be used, such as a steepest descent method, Newton's method, quasi-Newton's method, and a simplex method.

Accordingly, using n types of grounds can reduce a variation (estimation error) of estimated values of specific reflectance $R_\infty$ and scattering coefficient Sx due to the difference in material characteristics on the surface of the grounds.

Furthermore, using the compensation formula of Saunderson, and so on, the Kubelka-Munk model may be applied on the basis of a compensated value of the actually measured spectral reflectance $R_n$. See, "Calculation of the Color of Pigmented Plastics", JOURNAL OF THE OPTICAL SOCIETY OF AMERICA, volume 32, pp. 727-736 (1942).

Specifically, instead of actual measured spectral reflectance spectral reflectance $R_i$, which is acquired by avoiding the effect of light reflection on an interface between the laminating film 40 and the outside, can be used as shown in following expressions (6) and (7):

$$R_i' = R_1 + (1-r_1)(1-r_2)R_i/(1-r_2R_i) = SD(R_i, r_1, r_2) \quad (6)$$

$$R_i = (R_i' - r_1)/\{(1-r_1)(1-r_2) + r_2R_i - r_1r_2\} = invSD(R_i', r_1, r_2) \quad (7)$$

where $r_1$ is the spectral reflectance of incident light from the outside on the laminating film 40 on the interface between the laminating film 40 and the outside, and $r_2$ is the spectral reflectance of outgoing light from the inside of the laminating film 40 on the interface between the laminating film 40 and the outside.

In this case, evaluation function Err' is given by following expression (8) as with the expression (5).

$$Err' = \Sigma\{invSD(R_i', r_1, r_2) - KM(R_g', R_\infty, Sx)\}^2 \quad (8)$$

When the spectral reflectances $r_1$ and $r_2$ are known, these values can be substituted into the expression (8). When the spectral reflectances $r_1$ and $r_2$ are unknown, these values can be estimated as with the other unknown values of $R_\infty$ and Sx. That is, it is possible to estimate ($R_\infty$, Sx, $r_1$, $r_2$) for minimizing the value of Err' in the expression (8).

By this correction, the spectral reflectance of the protective-film-covered print 42 can be predicted more accurately because the light reflection on an interface between the laminating film 40 and the outside is further considered.

Moreover, the following relationship, shown by expression (9), exists between the specific reflectance $R_\infty$, the scattering coefficient S, and the absorption coefficient K.

$$K/S = (1-R_\infty)^2/2R_\infty \quad (9)$$

Therefore, the absorption coefficient K (or Kx) may be used instead of either the specific reflectance $R_\infty$ or the scattering coefficient S (or Sx). In other words, from among these three optical material characteristic values, once any two of them has been determined, the value of the other one can be determined uniquely.

Figure 10A:
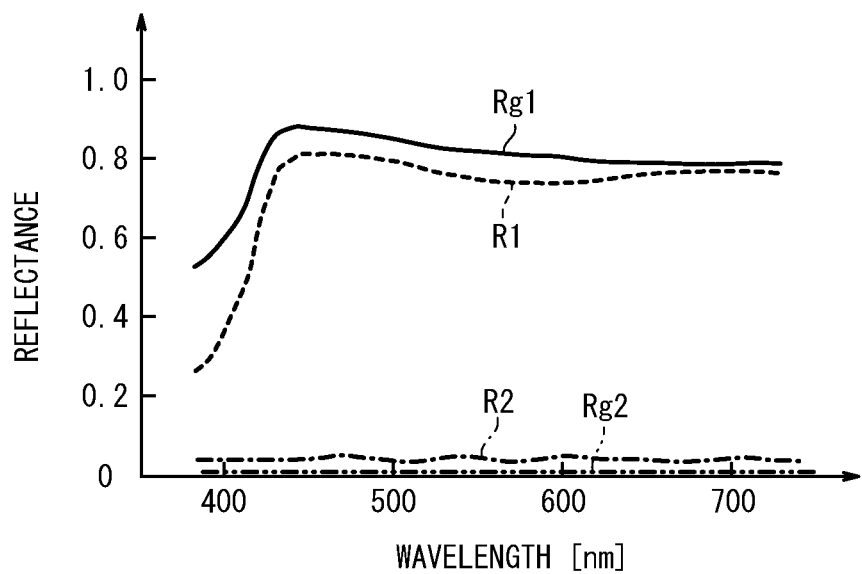
FIGS. 10A and 10B are graphs showing the results of estimation of optical material characteristic values of a protective film, based on an estimating method according to the present embodiment.
Figure 10B:
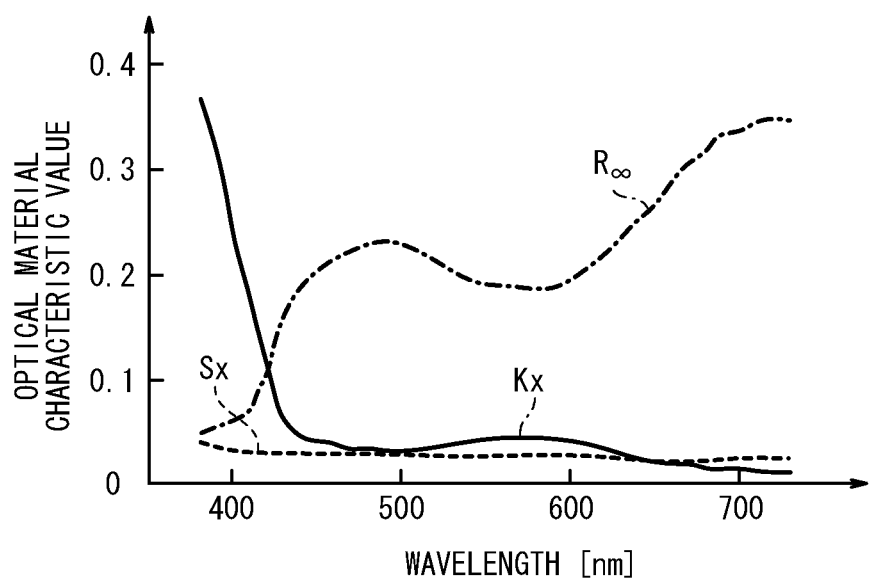

FIGS. 10A and 10B each show graphs illustrating the results of estimation of optical material characteristic values of the laminating film 40, using an estimating method according to the present embodiment. The structure of the measurement specimen 300 was as shown in FIG. 9A, and a matt (non-glossy) film was used for the laminating film 40.

In FIG. 10A, the wavelength (nm) is shown on the horizontal axis, whereas the actual measured reflectance (0 to 1) is shown on the vertical axis. In descending order of reflectance, the reflectances $Rg_1$, $R_1$, $R_2$, and $Rg_2$ are plotted.

FIG. 10B shows estimated optical material characteristic values according to the expressions (1) to (5) based on the actual measured results shown in FIG. 10A.

In FIG. 10B, the wavelength (nm) is shown on the horizontal axis, whereas the estimated optical material characteristic values are shown on the vertical axis. In descending order of value around the wavelength of 500 nm, the specific reflectance $R_\infty$, the absorption coefficient Kx, and the scattering coefficient Sx are plotted.

Figure 11:
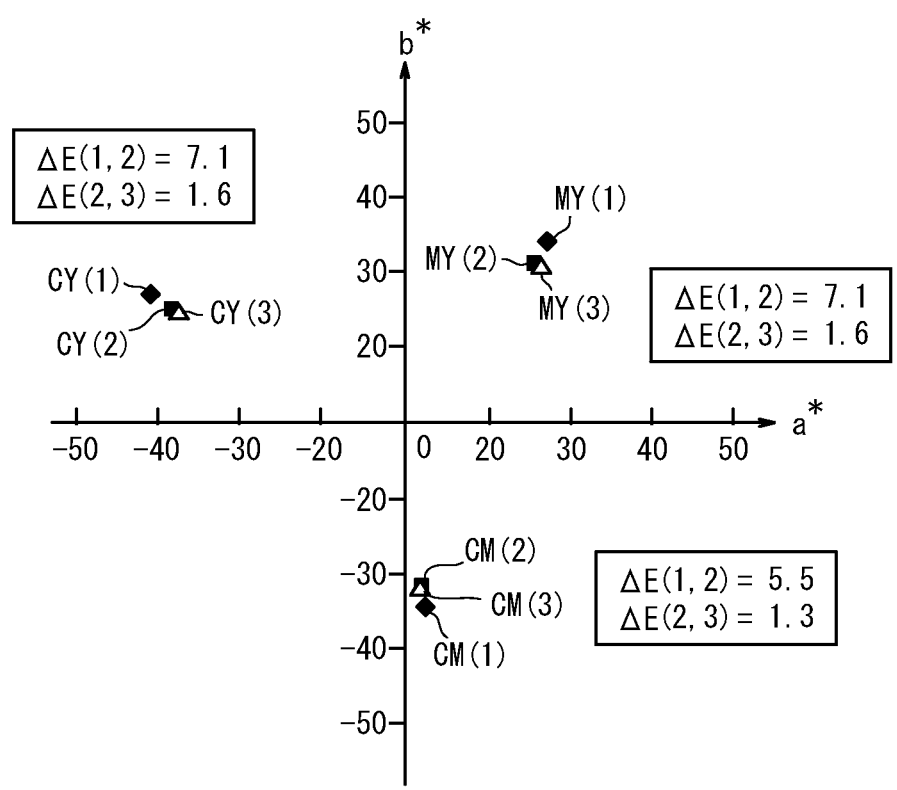
FIG. 11 is an explanatory view of a comparison between colorimetric values (predicted values) of a protective-film-covered print that are obtained based on the estimated optical material characteristic values shown in FIG. 10B and measurement values obtained from the actual protective-film-covered print.

FIG. 11 is an explanatory view of a comparison between colorimetric values (predicted values) of a protective-film-covered print 42 that are obtained based on the estimated optical material characteristic values shown in FIG. 10B and the actual measurement values obtained from the actual protective-film-covered print 42. FIG. 11 shows a graph of the a*b* plane (two-dimensional coordinate system) in the L*a*b* space, in which a* is shown on the horizontal axis, whereas b* is shown on the vertical axis.

A first sample is a solid image printed by the printing machine 18, with the settings of CMYK values: C=0%, M=70%, Y=70%, and K=0%. In FIG. 11, specifically, reference symbol MY(1) represents an actual measured value of the printed object 38. Reference symbol MY(2) represents an actual measured value of the protective-film-covered print 42. Reference symbol MY(3) represents a predicted value of the protective-film-covered print 42. All the positions of the reference symbols MY(1), MY(2), MY(3) are plotted in the first quadrant of the a*b* plane.

A second sample is a solid image printed by the printing machine 18, with the settings of CMYK values: C=70%, M=0%, Y=70%, and K=0%. In FIG. 11, specifically, reference symbol CY(1) represents an actual measured value of the printed object 38. Reference symbol CY(2) represents an actual measured value of the protective-film-covered print 42. Reference symbol CY(3) represents a predicted value of the protective-film-covered print 42. All the positions of the reference symbols CY(1), CY(2), CY(3) are plotted in the second quadrant of the a*b* plane.

A third sample is a solid image printed by the printing machine 18, with the settings of CMYK values: C=70%, M=70%, Y=0%, and K=0%. In FIG. 11, specifically, reference symbol CM(1) represents an actual measured value of the printed object 38. Reference symbol CM(2) represents an actual measured value of the protective-film-covered print 42. Reference symbol CM(3) represents a predicted value of the protective-film-covered print 42. All the positions of the reference symbols CM(1), CM(2), CM(3) are plotted in the fourth quadrant of the a*b* plane.

As a result of comparison, the color differences between the predicted values and the actual measured values of the protective-film-covered print 42 fall in the range of 1.3 to 1.6. This prediction error is relatively small compared with the variation in the color differences generated depending on whether or not the laminating film 40 is used in the measurement of the spectral reflectance (the range of 5.5 to 7.1).

Thus, by using the estimating method according to the present embodiment, it is possible to predict the print color of the protective-film-covered print 42 easily and highly accurately.

FIG. 12 is a view showing by way of example a screen for adjusting optical material characteristic values of a laminating film 40.

A setting image 200 basically comprises a coordinate display field 202, a mouse pointer 204, two text boxes 206, 208, a gauge 210, a slider 212, a text box 214, a graph 216, and three buttons 218, 220, 222.

The coordinate display field 202 on the upper left side of the setting image 200 shows a settable range (0.0 to 2.0 for S and K) of the scattering coefficient S and the absorption coefficient K. An operator moves the mouse pointer 204 in the settable range by the operation of the mouse 32 (see FIG. 1) to set the values of Sx and Kx. Also, the operator may enter desired numbers into the two respective text boxes 206, 208 through the operation of the keyboard 30 (see FIG. 1) to set the values of Sx and Kx. Accordingly, the operator can adjust the balance of the scattering coefficient Sx and the absorption coefficient Kx of the laminating film 40 by such operation. In fact, these values are used as adjustment factors (multipliers) to the scattering coefficient Sx and the absorption coefficient Kx.

The gauge 210 on the lower left side of the setting image 200 shows a settable range (0.0 to 2.0) of a film thickness (x) of the laminating film 40. The operator moves the slider 212 laterally in the settable range by the operation of the mouse 32 (see FIG. 1) to change the film thickness (x) of the laminating film 40. Also, the operator may enter a desired number into the text box 214 through the operation of the keyboard 30 (see FIG. 1) to change the film thickness (x) of the laminating film 40. Accordingly, the operator can adjust the film thickness (x) of the laminating film 40 by such operation. In fact, the value is used as an adjustment factor (multiplier) to the scattering coefficient Sx and the absorption coefficient Kx.

The graph 216 on the right side of the setting image 200 shows estimated optical material characteristic values (Sx and Kx) in a display manner similar to FIG. 10B.

When the operator presses the "OK" button 218 below the graph 216, adjusted setting values are input to the main unit 24 and stored in the storage unit 76. On the other hand, when the operator presses the "CANCEL" button 222, the setting image 200 closes and the setting operation is brought to an end.

Further, when the operator presses the "SIMULATE" button 220, the main unit 24 starts predictive simulation of the print color on the display screen of the display device 26. That is, the simulated print colors of the protective-film-covered print 42 are reproduced on the display screen of the display device 26 (high-intensity/high-definition monitor) for predicting or evaluating the appearance of the print colors.

The simulator 67 of the main unit 24 also has a profile managing function for matching color appearances in the different devices, as well as an above-mentioned print color-predicting function.

Thus, if the setting values of the optical material characteristic values of the laminating film 40 are adjusted and the adjusting results are displayed on the display device 26, then print colors can be predicted (optimization of color reproduction) without producing the printed object 38 by the printing machine 18.

Although a preferred embodiment of the present invention has been shown and described in detail, the invention is not limited by this embodiment, and various changes and modifications may be made thereto without departing from the scope of the invention as set forth in the appended claims.

For example, in the present embodiment, the color chart 38c has one hundred color patches 44, there are forty-one spectral data, and the light wavelengths are spaced at intervals of 10 nm. However, these numerical values may be changed freely, considering comprehensively features such as color reproduction accuracy, image processing time, etc.

Further, in the present embodiment, the colorimetric values of the protective-film-covered print 42 are predicted using an equation according to a known Kubelka-Munk theoretical model. Further, it is a matter of course that transformed equations thereof or other mathematical models can be applied to the prediction of the colorimetric values.

Further, in the present embodiment, the printing machine 18 comprises an inkjet printing apparatus. However, the printing machine 18 is not limited to any particular type of apparatus, and the advantages and effects of the invention can be obtained with an electrophotographic apparatus, a thermosensitive apparatus, or the like.

What is claimed is:

1. A print color predicting method for predicting color reproduction of a protective-film-covered print, which is made up of a printed object covered by a protective film, comprising: an acquiring step for acquiring a spectral reflectance of the printed object; an estimating step for estimating an optical material characteristic value of the protective film; and a predicting step for predicting a spectral reflectance of the protective-film-covered print, using the acquired spectral reflectance of the printed object and the estimated optical material characteristic value of the protective film, wherein the estimating step includes the steps of: acquiring spectral reflectances of at least two types of backgrounds, and spectral reflectances in a case where the protective film is disposed on the at least two backgrounds; obtaining relational expressions based on a predetermined mathematical model for the respective backgrounds, using the acquired spectral reflectances and an optical material characteristic value of the protective film as an unknown value; obtaining simultaneous equations from the obtained relational expressions; and estimating the optical material characteristic value of the protective film by solving the simultaneous equations.

2. A print color predicting method according to claim 1, wherein the acquiring step further acquires a spectral distribution of an observational light source, and the print color predicting method further comprises a calculating step for calculating a colorimetric value of the protective-film-covered print, using the acquired spectral distribution of the observational light source and the predicted spectral reflectance of the protective-film-covered print.

3. A print color predicting method according to claim 1, wherein the predicting step predicts the spectral reflectance of the protective-film-covered print based on a predetermined mathematical model, using the estimated optical material characteristic value of the protective film.

4. A print color predicting method according to claim 1, wherein the optical material characteristic value of the protective film comprises two independent optical material characteristic values selected from the group consisting of a specific reflectance, a scattering coefficient, and an absorption coefficient of the protective film for each of light wavelengths.

5. A print color predicting apparatus for predicting color reproduction of a protective-film-covered print, which is made up of a printed object covered by a protective film, comprising: a first acquisition unit for acquiring a spectral reflectance of the printed object; an estimating unit for estimating an optical material characteristic value of the protective film; and a predicting unit for predicting a spectral reflectance of the protective-film-covered print, using the spectral reflectance of the printed object acquired by the first acquisition unit and the optical material characteristic value of the protective film estimated by the estimating unit, wherein the estimating unit is configured to perform: acquiring spectral reflectances of at least two types of backgrounds, and spectral reflectances in a case where the protective film is disposed on the at least two backgrounds; obtaining relational expressions based on a predetermined mathematical model for the respective backgrounds, using the acquired spectral reflectances and an optical material characteristic value of the protective film as an unknown value; obtaining simultaneous equations from the obtained relational expressions; and estimating the optical material characteristic value of the protective film by solving the simultaneous equations.

6. A print color predicting apparatus according to claim 5, further comprising: a second acquisition unit for acquiring a spectral distribution of an observational light source; and a calculating unit for calculating a colorimetric value of the protective-film-covered print, using the spectral distribution of the observational light source acquired by the second acquisition unit and the spectral reflectance of the protective-film-covered print predicted by the predicting unit.

7. A print color predicting apparatus according to claim 5, wherein the first acquisition unit acquires the spectral reflectance of the printed object from a database.

8. A computer-readable recording medium recording therein a print color predicting program for enabling a computer to predict color reproduction of a protective-film-covered print, which is made up of a printed object covered by a protective film, the program further enabling the computer to function as: means for acquiring a spectral reflectance of the printed object; means for estimating an optical material characteristic value of a protective film; and means for predicting a spectral reflectance of the protective-film-covered print, using the acquired spectral reflectance of the printed object and the estimated optical material characteristic value of the protective film, wherein the means for estimating includes: acquiring spectral reflectances of at least two types of backgrounds, and spectral reflectances in a case where the protective film is disposed on the at least two backgrounds; obtaining relational expressions based on a predetermined mathematical model for the respective backgrounds, using the acquired spectral reflectances and an optical material characteristic value of the protective film as an unknown value; obtaining simultaneous equations from the obtained relational expressions; and estimating the optical material characteristic value of the protective film by solving the simultaneous equations.

9. A profile generating method comprising: an acquiring step for acquiring a spectral reflectance of a printed object; an estimating step for estimating an optical material characteristic value of a protective film to cover the printed object; a predicting step for predicting a spectral reflectance of a protective-film-covered print, which is made up of the printed object covered by the protective film, using the acquired spectral reflectance of the printed object and the estimated optical material characteristic value of the protective film; a determining step for predicting the spectral reflectance of the protective-film-covered print based on the spectral reflectance of a color chart as the printed object, and determining spectral reflectances corresponding to respective grid points of a color conversion table based on the spectral reflectance of the protective-film-covered print; and a generating step for generating a profile based on the spectral reflectances corresponding to the respective grid points of the color conversion table, wherein the estimating step includes the steps of: acquiring spectral reflectances of at least two types of backgrounds, and spectral reflectances in a case where the protective film is disposed on the at least two backgrounds; obtaining relational expressions based on a predetermined mathematical model for the respective backgrounds, using the acquired spectral reflectances and an optical material characteristic value of the protective film as an unknown value; obtaining simultaneous equations from the obtained relational expressions; and estimating the optical material characteristic value of the protective film by solving the simultaneous equations.

10. A profile generating method according to claim 9, further comprising a selecting step for selecting a type of a medium that forms the printed object, a type of the protective film, or a type of an observational light source, wherein the generating step generates the profile, by using the spectral reflectances corresponding to the respective grid points of the color conversion table for the selected medium, the optical material characteristic value of the selected protective film, and a spectral distribution of the selected observational light source.

11. A profile generating method according to claim 9, further comprising an adjusting step for adjusting the optical material characteristic value of the protective film.

* * * * *